United States Patent [19]
Lotz et al.

[11] Patent Number: 5,147,642
[45] Date of Patent: Sep. 15, 1992

[54] USE OF BACTERIOLYTIC ENZYME PRODUCT AND PROTEASE AS ADDITIVE FOR IMPROVING FEED CONVERSION IN LIVESTOCK PRODUCTION

[75] Inventors: Andreas Lotz, Frankfurt am Main; Hans-Dieter Pries, Eching; Gerhard Wöhner, Wunstorf; Stefan E. Scheuermann, Hünstetten, all of Fed. Rep. of Germany

[73] Assignee: Hoechst Aktiengesellschaft, Frankfurt am Main, Fed. Rep. of Germany

[21] Appl. No.: 446,541

[22] Filed: Dec. 5, 1989

[30] Foreign Application Priority Data

Dec. 7, 1988 [DE] Fed. Rep. of Germany ....... 3841152

[51] Int. Cl.$^5$ .............................................. A61K 37/54
[52] U.S. Cl. .................................... 424/94.61; 426/2; 424/94.6
[58] Field of Search .......................... 424/94.61; 426/2

[56] References Cited

U.S. PATENT DOCUMENTS 4,828,998  1/1989  Wöhner et al. ..................... 435/206

FOREIGN PATENT DOCUMENTS 0297598  7/1987  European Pat. Off. .
0257996  3/1988  European Pat. Off. .
88/00071 8/1988  PCT Int'l Appl. .

OTHER PUBLICATIONS

Derwent File Supplier, 1988, AN-88-344733[48] to Anderson et al., May 23, 1988.

Primary Examiner—Douglas W. Robinson
Assistant Examiner—Jean C. Witz
Attorney, Agent, or Firm—Finnegan, Henderson, Farabow, Garrett, and Dunner

[57] ABSTRACT

It has been found that bacteriolytic enzyme products and proteases can be added in a mixture as additive to feedstuffs, whereby an improvement in feed conversion, manifested by improved growth of the livestock, is brought about.

9 Claims, No Drawings

USE OF BACTERIOLYTIC ENZYME PRODUCT AND PROTEASE AS ADDITIVE FOR IMPROVING FEED CONVERSION IN LIVESTOCK PRODUCTION

The use of additives in animal feed for improving feed conversion is known. These production promoters mainly take the form of substances with antibacterial activity, such as, for example, Flavomycin ®, a mixture of various phosphoglycolipid antibiotics, the moenomycins, whose use as feed additive is described in German Patent 1,203,107.

WO 8904-320 discloses the preparation of an animal lysozyme with the aid of a genetically modified microorganism. A lysozyme of this type can be employed as feed additive for ruminants to improve the weight gain.

SU 1397-019 describes a mixture of lysozyme and citric acid or acetic acid as growth stimulator for livestock.

It has now been found, surprisingly, that the use of bacteriolytic enzyme product from Streptomyces coelicolor DSM 3030, as well as the mutants and variants thereof which likewise produce the enzyme product, is advantageous as feed additive. Moreover, a mixture of bacteriolytic enzyme product and protease can be used in feedstuffs with very good results in the weight gain and the feed conversion of livestock.

Hence the invention relates to:

1. The use of bacteriolytic enzyme product from Streptomyces coelicolor DSM 3030, as well as the mutants and variants thereof, as additive to animal feed.
2. The use of a mixture of bacteriolytic enzyme product with N-acetylmuramidase activity and protease as additive to animal feed.
3. A feedstuff which contains the product specified in 1. or 2. as additive.

The invention is described in detail hereinafter, especially in its preferred embodiments. The invention is futhermore defined by the contents of the claims.

The enzyme product with N-acetylmuramidase activity from DSM 3030 can be employed both in pure form and mixed with other substances, for example with fermentation residues or proteins. The isolation of this enzyme product from Streptomyces coelicolor DSM 3030, as well as the characterization thereof, is described in detail in German Offenlegungsschrift 3,440,735.

Streptomyces coelicolor DSM 3030 is cultured, for example, in a nutrient medium which contains sugarbeet molasses in a quantity of 5 to 50 g, preferably 10 to 20 g, per liter of culture medium. The yield can be increased further if calcium ions are added to the medium in the form of readily soluble, non-toxic calcium salts. A calcium concentration of 0.05 to 1 molar is advantageous.

The enzyme product is secreted into the culture medium. The enzyme with N-acetylmuramidase activity can be isolated pure from the medium by methods known per se, for example by precipitation or extraction. However, it is not absolutely necessary to work up the fermentation supernatant to isolate the bacteriolytic enzyme product, it is sufficient to add it as dry product directly to the feed. The fermentation supernatant is preferably dried by spray drying.

A bacteriolytic enzyme product prepared in this way is, however, associated with proteases. In order to obtain the pure enzyme product, it is possible to carry out a purification with the aid of ion exchanger chromatography on weakly acid macroporous cationic exchangers. A corresponding process is described in European Patent Application 280,032.

The resulting bacteriolytic enzyme product is stable and active in terms of its lytic activity in a pH range from below 3 to 9. After incubation at room temperature in buffer mixtures for 16 hours, the maximum activity in the range from pH 3 to 9 was still at least 80% retained.

The temperature optimum for the activity of the bacteriolytic enzyme product is in the range from 50° to 60° C. Above this range at least 90% of the maximum activity are reached. Starting from low temperatures, the activity increases slowly with increasing temperature up to 60° C.: it is about 10% at room temperature, about 30% at 30° C., and about 60% at 40° C., of the maximum activity. There is a rapid fall in activity at higher temperatures: it is still about 30% at 65° C., and 10% at 70° C., of the maximum activity.

It is also possible to use a bacteriolytic enzyme product mixed with proteases. In this connection, every bacteriolytic enzyme product with N-acetylmuramidase activity can in principle be used according to the invention. An enzyme product of this type is composed principally of one or more enzymes with N-acetylmuramidase activity, but it is perfectly possible to add other substances, for example fermentation residues, to these enzymes. The enzyme product can be obtained from plant or animal tissue or be of microbial origin. A particularly suitable bacteriolytic enzyme product is one obtained from Streptomyces coelicolor DSM 3030, as well as one obtained from the variants and mutants thereof The proteases are, in particular, trypsin- or chymotrypsin-like enzymes. The use of the protease-containing enzyme mixture is advantageous because better results are achieved in the feed conversion with these products The ratio of bacteriolytic enzyme product to protease ought to be in the range from 1:1 to 1,000:1, advantageously in the range from 100:1 to 500:1, based on enzyme activity.

The bacteriolytic enzyme product from DSM 3030, as well as the enzyme mixture just described, can in principle be added to all feedstuffs. Suitable and preferred examples are those which comply with the provisions of the feedstuffs legislation, such as complete feed, supplementary feed and mineral feed.

The bacteriolytic enzyme product can dosed in the range from 0.1 to 100,000 ppm, preferably in the range from 1 to 1,000 ppm. The lytic activity of bacteriolytic enzyme product is normally stated in units (U). The N-acetylmuramidase activity is measured as described in German Offenlegungsschrift 3,440,735. In the feed it should expediently be between 0.1 and 100 U/mg of feed, preferably between 0.5 and 50 U/mg.

The enzyme product, alone or in a mixture, is mixed with the feed batchwise in appropriate ratios by weight. In this connection, it is important that the active substances in the feed are homogeneously distributed.

Feedstuffs which contain bacteriolytic enzyme product from DSM 3030 or the mixture of bacteriolytic enzyme product and protease can be employed for feeding all livestock, but particularly advantageously for feeding agricultural livestock used for the production of foodstuffs, in particular broilers, turkeys, pigs and cattle.

Addition of the bacteriolytic enzyme product or of the mixture to the feedstuffs brings about a considerable improvement in the utilization thereof and, connected with this, an improvement in growth of the livestock. The use thereof as additive to feedstuffs has, by comparison with additives having antibiotic activity, the great advantage that there is no risk of resistance development on use over a prolonged period.

The invention is to be explained in more detail hereinafter by means of examples.

EXAMPLE 1

Cultivation of *S. coelicolor* DSM 3030

Slant agar medium which contained 2% soybean meal, 2% mannitol and 1.5% agar (pH 7.5) was inoculated with Streptomyces coelicolor DSM 3030 and cultivated at 30° C. for 10 days. 10 ml of a sterile solution of 0.9% NaCl and 0.01% of a nonionic surfactant were added to the slant culture, and the spores were rinsed out. 0.2 ml of the spore suspension was used as inoculum for shake cultures of 100 ml culture medium in culture flasks of 300 ml capacity.

Culture media Nos. 1-3 listed in Table 1 were made up, inoculated and shaken at a rate of 160 rpm and at 30° C. Samples were taken after 2, 4 and 6 days, the cells were removed by centrifugation, and the activity of the bacteriolytic enzyme product in the culture supernatant was determined (Table 2).

The highest yields of bacteriolytic enzyme product were obtained with nutrient solution 3 which, besides glucose, soybean meal and casein peptone, contained 2% sugarbeet molasses.

TABLE 1

| Culture media | Medium No. | | |
|---|---|---|---|
| % | 1 | 2 | 3 |
| Glucose | 2 | | 1 |
| Mannitol | | 2 | |
| Soybean meal | 2 | 1 | 0.5 |
| Casein peptone | | | 0.5 |
| Molasses | | 1 | 2 |

TABLE 2

Activity of bacteriolytic enzyme product in the culture supernatant (U/ml)

| Fermentation time | Medium No. | | |
|---|---|---|---|
| days | 1 | 2 | 3 |
| 2 | 21 | 15 | 363 |
| 4 | 367 | 378 | 1106 |
| 6 | 236 | 558 | 2088 |

EXAMPLE 2

Increasing the Yield by Addition of Calcium

Streptomyces coelicolor DSM 3030 was cultivated in the manner described in Example 1 on a nutrient medium which contained 1% glucose, 2% molasses, 0.5% soybean meal, 0.5% casein peptone and 0.5% $CaCl_2 \times 2H_2O$. The addition of $CaCl_2$ resulted in a considerable increase in the yield of bacteriolytic enzyme product in the culture supernatant, 768 U/ml, 2,462 U/ml and 4,715 U/ml being obtained after 2, 4 and 6 days.

EXAMPLE 3 a) Determination of the Activity of Bacteriolytic Enzyme Product 0.2 ml samples containing bacteriolytic enzyme product are pipetted into 2.8 ml of a suspension of 0.2 mg of Micrococcus luteus ATCC 4698 (Boehringer Mannheim) per ml of 0.1 M sodium acetate buffer (pH 5.0), and the decrease in turbidity is determined at 25° C. by measuring the extinction at 450 nm. 1 U is defined as a decrease in extinction of 0.001 photometer scale units per minute.

b) Determination of Protease Activity with Azocasein

Starting material:
Buffer: 0.1M sodium phosphate buffer (pH 7.0)
Azocasein solution: 250 mg of azocasein + 10 ml of buffer stir until no more azocasein dissolves; remove undissolved azocasein by centrifugation, and use the supernatant for the assay.

Procedure:
Pipette the following into 15 ml glass centrifuge tubes

| Sample | Blank |
|---|---|
| 2 ml sample | 2 ml sample |
| | add 0.5 ml of buffer | preheat in a waterbath at +40° C. for 5 min.
add 0.5 ml of azocas. solution (40° C.)
mix
incubate in a waterbath at +40° C. for 30 min
add 0.2 ml of 70% strength perchloric acid (to stop reaction)
mix
leave to stand at room temperature for 5 min
remove precipitated casein by centrifugation
determine the supernatants by photometry ($E_{440}$)

0 value: buffer is used in the assay in place of the sample
the 0 value should be 0.050-0.060 ($E_{440}$).

Calculation:

$$1U_{azoc.}/ml = \frac{\Delta E\ 0.001}{min} = \frac{(\Delta E - 0\ value) \times 1.000}{30} \times dilution$$

EXAMPLE 4

6-Month Trial with Fattening Bulls

In a 6-month trial with fattening bulls, groups each of 9 animals received dosages of 100 ppm or 200 ppm enzyme product per head and day (obtained by drying the cultivation supernatant after cells of Streptomyces coelicolor DSM 3030 had been removed) per kg of supplementary feed, which corresponds to an average dosage of enzyme mixture of 326 mg and 454 mg, respectively, per head and day. Apart from the improvement in growth and in the feed conversion due to the product, nothing abnormal was found in the treated stock.

EXAMPLE 5

Rat Trial

Rats in the weight range 65-180 kg live mass received a standardized rat feed (Altromin No. 3121, Altromin International, Lage/Lippe, FR Germany) which was adjusted to the needs of growing rats. 6 animals were employed for each treatment and were distributed over the "control" group (no additives), test group I (19 U of lysozyme/mg of feed) and test group II (38 U of lysozyme/mg of feed). The animals were housed singly in metabolism cages.

For each animal the feed consumption was recorded daily, and the weight weekly. A 14-day feeding period was followed by a 7-day nitrogen-balance period with quantitative collection of feces and urine.

The nitrogen retention was calculated, as a measure of the protein gain, from the difference between the consumption of nitrogen from the feed and the excretion of nitrogen in the feces and urine.

Result (Table 1)

The weight gains in test groups I and II were increased by 4.2 and 3.1% respectively, and the feed consumption was improved by an average of 28.5 and 25.2% respectively.

EXAMPLE 6

Piglet Trial

Piglets in the weight range 15-25 kg live mass received a compound feed which was based on cereal, soybean and fish meals and which was supplemented with vitamins, trace elements and major elements to suit requirements (Tab. 3). The control group (n=10) and test group (n=7) received the feed without and with, respectively, addition of 10 U of lysozyme activity/mg of feed.

The feed consumption was recorded per meal (2/day) and the weight gain was recorded weekly. The daily gains (g/d) and the feed conversion ratio (kg of feed/kg of gain) were calculated at the end of the trial.

Result (Table 2)

The weight gain was improved by an average of 4.7% by the addition, and the feed conversion ratio was reduced by an average of 8.5%.

TABLE 1

Effect of lysozyme/protease combination on rats

| Group | Activity Lysozyme U/mg of feed | Activity Protease U/mg of feed | Daily gains g/d | Feed conversion | Nitrogen retention g/d |
|---|---|---|---|---|---|
| Control | | | 5.46 ±0.16 100.0 | 3.04 ±0.09 100.0 | 0.151 ±0.010 100.0 |
| I | 19 | 0.04 | 5.69 ±0.18 104.2 | 2.94 ±0.12 96.7 | 0.194 ±0.016 128.5 |
| II | 38 | 0.08 | 5.63 ±0.13 103.1 | 2.94 ±0.09 96.7 | 0.189 ±0.008 125.2 |
| p* | | | ≦0.05 | 0.05 | 0.001 |

*probability of error

TABLE 2

Effect of lysozyme/protease combination on piglets

| Activity Lysozyme U/mg of feed | Activity Protease U/mg of feed | Daily gains g/d | Feed conversion |
|---|---|---|---|
| Control | | 400.7 ±77.3 100.0 | 1.89 ±0.30 100.0 |
| 10 | 6.7 × 10$^{-5}$ | 419.5 ±61.2 104.7 | 1.73 ±0.20 91.5 |

TABLE 3

| Feed composition in % | |
|---|---|
| Barley | 20.0 |
| Wheat | 10.0 |
| Oats | 6.0 |
| Corn | 25.2 |
| Linseed cake | 5.5 |
| Alfalfa meal | 4.0 |
| Extracted soybean meal | 18.0 |
| Fishmeal | 4.0 |
| Wheatbran | 5.0 |
| Vitamins and mineral mix | 2.3 |

We claim:

1. A method of improving feed conversion in livestock using the bacteriolytic enzyme product from Streptomyces ceolicolor DSM 3030 characterized as having a temperature optimum of 50° to 60° C. and the ability to lyse bacteria at a pH of 3.0 to 9.0, as well as mutants and variants thereof, comprising adding an effective amount of said product to animal feed.

2. A method of improving feed conversion in livestock using the bacteriolytic enzyme product from Streptomyces ceolicolor DSM 3030 characterized as having a temperature optimum of 50° to 60° C. and the ability to lyse bacteria at a pH of 3.0 to 9.0, as well as mutants and variants thereof comprising adding an effective amount of said product in combination with a protease to animal feed.

3. The method as claimed in claim 2, wherein the bacteriolytic enzyme product is employed in the form of the dried nutrient medium.

4. The method as claimed in claim 1, wherein the bacteriolytic enzyme product is contained in the feedstuff at an N-acetylmuramidase activity of 0.1 to 1,00 U/mg of the latter.

5. The method as claimed in claim 2, wherein the bacteriolytic enzyme product is contained in the feedstuff at an N-acetylmuramidase activity of 0.1 to 1,00 U/mg of the latter.

6. The method as claimed in claim 4, wherein the activity is 0.5 to 50 U/mg.

7. The method as claimed in claim 5, wherein the activity is 0.5 to 50 U/mg.

8. The method as claimed in claim 2, wherein the ratio of bacteriolytic enzyme product to protease is in the range 1:1 to 1,000:1, based on enzyme activity.

9. The method as claimed in claim 8, wherein the ratio is in the range 100:1 to 500:1.

* * * * *